United States Patent [19]
Robinson et al.

[11] Patent Number: 5,991,066
[45] Date of Patent: Nov. 23, 1999

[54] MEMBRANE-ACTUATED CHARGE CONTROLLED MIRROR

[75] Inventors: William P. Robinson, Thousand Oaks; Michael J. Little, Woodland Hills; Eric A. Gifford, Newbury Park, all of Calif.

[73] Assignee: MEMSolutions, Inc., Westlake Village, Calif.

[21] Appl. No.: 09/172,613

[22] Filed: Oct. 15, 1998

[51] Int. Cl.⁶ .............................. G02B 26/08; G02B 26/02
[52] U.S. Cl. ......................... 359/293; 359/291; 359/292; 359/298
[58] Field of Search ................................... 359/223, 224, 359/290, 291, 292, 293, 295, 298; 348/770, 771

[56] References Cited

U.S. PATENT DOCUMENTS

| | | | |
|---|---|---|---|
| 2,681,380 | 6/1954 | Orthuber | 178/5.4 |
| 2,682,010 | 6/1954 | Orthuber | 315/8 |
| 2,733,501 | 2/1956 | Orthuber et al. | 29/25.17 |
| 3,517,216 | 6/1970 | Yamada et al. | 178/7.5 |
| 3,600,798 | 8/1971 | Lee | 29/592 |
| 3,678,196 | 7/1972 | Roth | 178/7.5 D |
| 3,746,785 | 7/1973 | Goodrich | 359/291 |
| 3,746,911 | 7/1973 | Nathanson et al. | 315/21 R |
| 3,886,310 | 5/1975 | Guldberg et al. | 178/7.5 D |
| 3,896,338 | 7/1975 | Nathanson et al. | 315/373 |
| 4,229,732 | 10/1980 | Hartstein et al. | 340/378 |
| 4,387,964 | 6/1983 | Arrazola et al. | 350/331 R |

(List continued on next page.)

OTHER PUBLICATIONS

Sang–Gook Kim, et al., "Actuated Mirror Array–13 A New Chip–based Display Device for the Ldarge Screen Display," SID Asia Display 1998.
S. Newman, et al., "Development of a 5.1 Inch Field Emission Display," Motorola Flat Panel Display Division, SID 1998.
Lawrence Dworsky, et al., "Field Emission Display Technology and Applications," Motorola Flat Panel Display Division, SID 1998.
B. Chalamala et al., "FED up with Fat Tubes," IEEE Spectrum, vol. 35, No. 4, pp. 41–51; Apr. 1998.
Robert T. Smith, "Electronics Development for Field–Emission Displays," Society for Information Display, SID 1998.
S.T. deZwart et al., "Basic Principles of a New Thin Flat CRT," SID Digest, pp. 239–242; 1997.
A.R. Knox et al., "A Flat–Panel CRT with a Permanent Magnet Aperture Plate," SID Digest, pp. 251–254; 1997.
E. Yamaguchi, et al., "A 10–in. Surface–Conduction Electron–Emitter Display," SID Digest, pp. 52–55, 1997.
C.J. Spindt et al., "ThinCRT™ Flat–Panel–Display Construction and Operating Characteristics," SID Digest, pp. 99–102; 1998.
J.A. van Raalte, "A New Schlieren Light Valve for Television Projection," Applied Optics vol. 9, No. 10, (Oct. 1970), p. 2225.
R. Noel Thomas et al., "The Mirror–Matrix Tube: A Novel Light Valve for Projection Displays," IEEE Transactions on Electron Devices, vol. ED–22, No. 9, Sep. 1975, p. 765.

*Primary Examiner*—Georgia Epps
*Assistant Examiner*—Margaret Burke
*Attorney, Agent, or Firm*—Fleshner & Kim

[57] ABSTRACT

An electrostatically actuated micromirror light modulator that exhibits increased deflection range, better charge efficiency and improved electrostatic stability. A thin insulating membrane decouples the electron beam from the micromirror array inside the vacuum cell. The membrane is just thick enough to stop the incident electrons from penetrating through to the mirrors but is thin enough to maintain resolution of the deposited charge pattern. An equipotential layer beneath the mirror array prevents any attractive force from being developed due to the accumulation of static charge on the surface of the light modulator that may otherwise cause the mirror to snap-over and become stuck to the substrate.

32 Claims, 5 Drawing Sheets

U.S. PATENT DOCUMENTS

| | | | |
|---|---|---|---|
| 4,441,791 | 4/1984 | Hornbeck | 350/360 |
| 4,592,628 | 6/1986 | Altman et al. | 350/486 |
| 4,615,595 | 10/1986 | Hornbeck | 353/122 |
| 4,680,579 | 7/1987 | Ott | 340/783 |
| 4,698,602 | 10/1987 | Armitage | 332/7.51 |
| 4,710,732 | 12/1987 | Hornbeck | 332/7.51 |
| 4,728,174 | 3/1988 | Grinberg et al. | 350/334 |
| 4,744,636 | 5/1988 | Haven et al. | 350/331 R |
| 4,765,717 | 8/1988 | Buzak et al. | 350/331 R |
| 4,784,883 | 11/1988 | Chitwood et al. | 428/1 |
| 4,786,149 | 11/1988 | Hoenig et al. | 350/356 |
| 4,805,038 | 2/1989 | Seligson | 358/296 |
| 4,826,293 | 5/1989 | Grinberg et al. | 350/331 R |
| 4,884,874 | 12/1989 | Buzak et al. | 350/336 |
| 4,956,619 | 9/1990 | Hornbeck | 330/4.3 |
| 5,083,857 | 1/1992 | Hornbeck | 359/291 |
| 5,085,497 | 2/1992 | Um et al. | 359/848 |
| 5,142,405 | 8/1992 | Hornbeck | 359/226 |
| 5,172,262 | 12/1992 | Hornbeck | 359/223 |
| 5,196,767 | 3/1993 | Leard et al. | 315/349 |
| 5,280,277 | 1/1994 | Hornbeck | 345/108 |
| 5,287,215 | 2/1994 | Warde et al. | 359/293 |
| 5,416,514 | 5/1995 | Janssen et al. | 348/196 |
| 5,442,414 | 8/1995 | Janssen et al. | 353/98 |
| 5,444,566 | 8/1995 | Gale et al. | 359/291 |
| 5,448,314 | 9/1995 | Heimbuch et al. | 348/743 |
| 5,452,024 | 9/1995 | Sampsell | 348/755 |
| 5,471,341 | 11/1995 | Warde et al. | 359/293 |
| 5,493,439 | 2/1996 | Engle | 359/292 |
| 5,504,614 | 4/1996 | Webb et al. | 359/223 |
| 5,508,738 | 4/1996 | Janssen et al. | 348/196 |
| 5,535,047 | 7/1996 | Hornbeck | 359/295 |
| 5,552,925 | 9/1996 | Worley | 359/230 |
| 5,557,177 | 9/1996 | Engle | 315/366 |
| 5,567,334 | 10/1996 | Baker et al. | 216/24 |
| 5,579,151 | 11/1996 | Cho | 359/291 |
| 5,600,383 | 2/1997 | Hornbeck | 348/771 |
| 5,631,782 | 5/1997 | Smith et al. | 359/871 |
| 5,636,070 | 6/1997 | Ji et al. | 359/855 |
| 5,650,881 | 7/1997 | Hornbeck | 359/871 |
| 5,669,687 | 9/1997 | Yang | 353/98 |
| 5,677,784 | 10/1997 | Harris | 359/290 |
| 5,706,061 | 1/1998 | Marshall et al. | 348/743 |
| 5,768,009 | 6/1998 | Little | 359/293 |
| 5,774,196 | 6/1998 | Marshall | 348/743 |
| 5,822,110 | 10/1998 | Dabbaj | 359/293 |
| 5,926,309 | 7/1999 | Little | 359/293 |

FIG.4
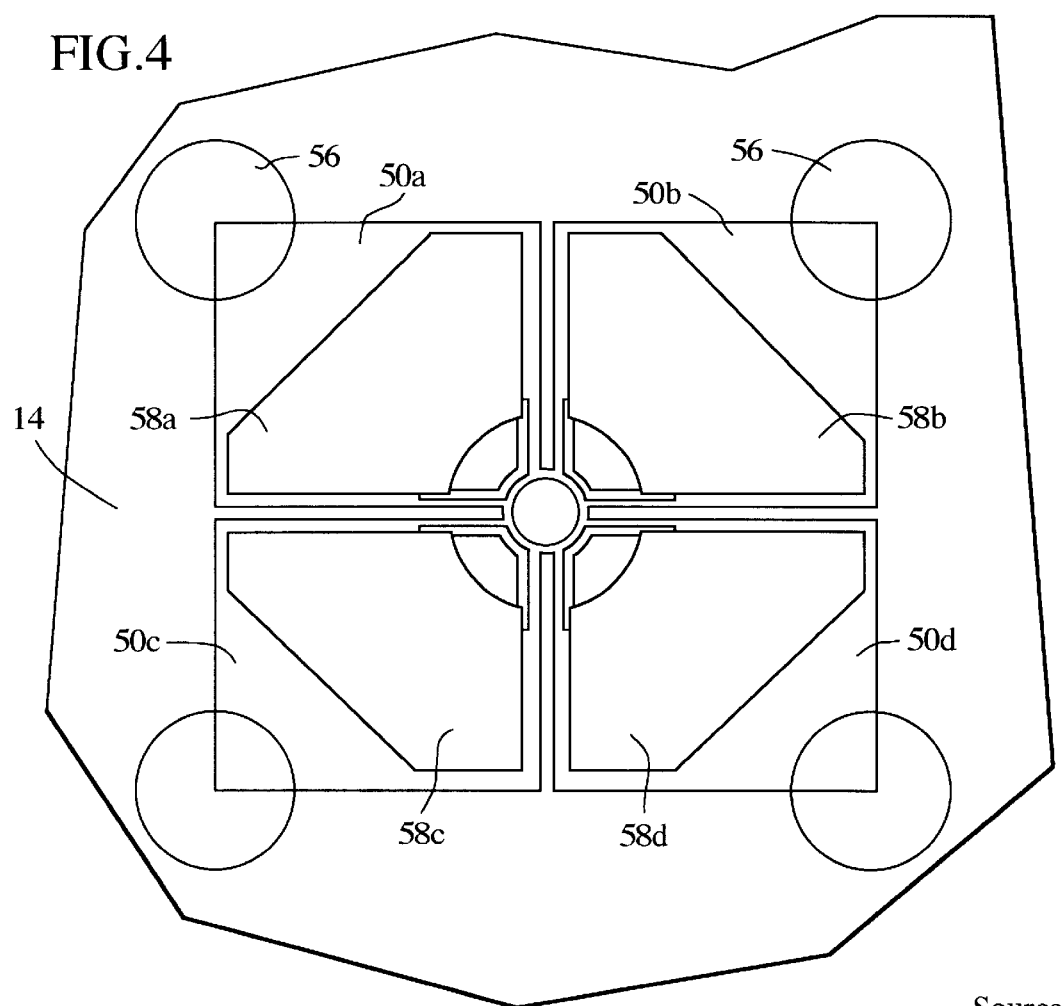
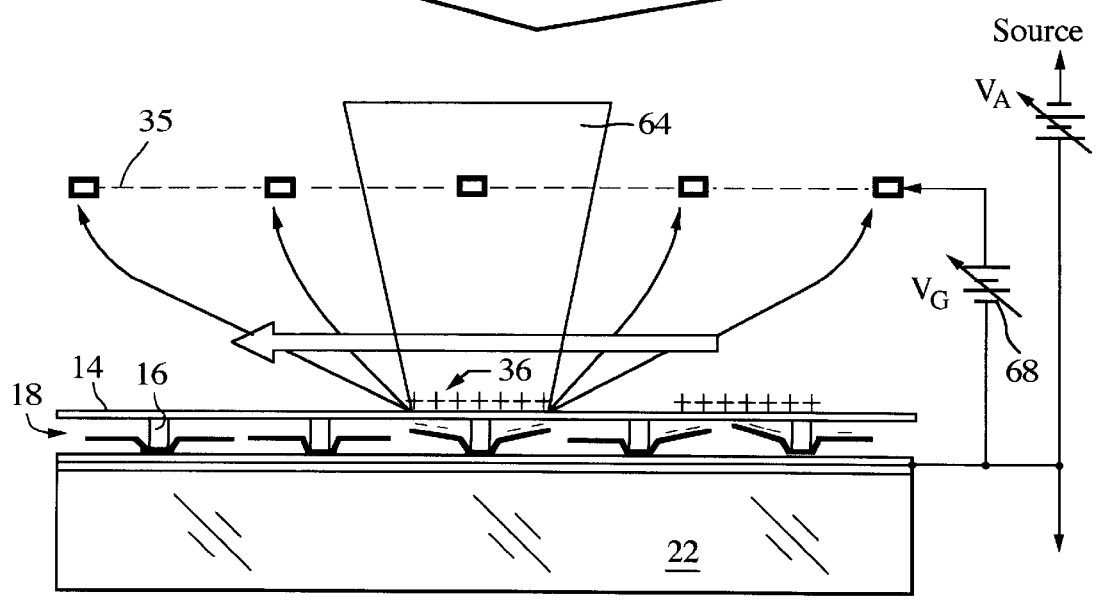
FIG.5a

MEMBRANE-ACTUATED CHARGE CONTROLLED MIRROR

BACKGROUND OF THE INVENTION

1. Field of the Invention

This invention relates to beam-addressed electrostatically-actuated light modulators and more specifically to a charge controlled mirror (CCM) that uses a thin insulating membrane to decouple the micromirror array from the beam within a vacuum.

2. Description of the Related Art

In an electrostatically-actuated light modulator, a beam of light is directed towards a light valve target that, in response to a video addressing signal, imparts a modulation onto the beam in proportion to the amplitude of the deflection of the individual reflective elements, e.g. a reflective thin-film or an array of micromirrors. The amplitude or phase modulated beam is then passed through projection optics to form the image. The target produces attractive electrostatic forces between the underlying substrate and the individual reflective elements that pull them inward toward the substrate. The amplitude of deflection corresponds to the pixel intensity in the video signal. It is well known that optical performance of the light modulator is closely tied to deflection range, electrostatic instability and resolution.

Deflection range is strictly limited by the spacing of the reflective elements above the substrate. Furthermore, it is commonly understood that only about one-third of the gap can be usefully employed due to problems of electrostatic instability. The attractive forces tend to overwhelm the restoring spring force of the reflective element, causing it to snap all the way to the base electrode. This problem is commonly referred to as pull-in or snap-over. Once the element snaps over, it remains stuck to the substrate due to the Van der Waals forces. The useful range can be extended to about four-fifths of the gap by using a control electrode underneath the element whose diagonal is about 60% of the length of the element's diagonal. However, this does increase the voltage required to achieve the same amount of deflection.

In the late 1960s, RCA developed a new Schlieren light valve that used a high energy scanning electron beam in a vacuum to address a thin metal film supported in close proximity to a glass substrate, which is described in J. A. van Raalte, "A New Schlieren Light Valve for Television Projection", Applied Optics Vol. 9, No. 10, (October 1970), p. 2225. The electron beam penetrates the metal film and deposits charge on the substrate in proportion to the intensity of the video signal. The deposited charge produces an attractive force that deforms the metal film inward towards the substrate, which causes a portion of the reflected light to miss the stop, thereby increasing screen brightness until eventually all the light reaches the screen. In actual operation, each pixel deforms parabolically. Consequently, light incident on the central portion of each pixel element is not deflected, which limits fill factor and optical efficiency. In addition, deflection range is limited to about 20% to maintain parabolic deformation.

Erasure is achieved by bleeding off the charge deposited in the dielectric layer through the faceplate of the vidicon tube. The faceplate's RC time constant can be set to insure that substantially all of the deposited charge is bled off in one frame time. However, the faceplate must be heated in order to minimize the variation in discharge times created by the traps in the dielectric material. In addition, the glass substrate will, over time, tend to discolor in response to the electron bombardment.

More recently Optron Systems, Inc., as described in Warde et al., U.S. Pat. No. 5,287,215, has developed a membrane light modulation system in which a charge transfer plate (CTP) couples charge from a scanning electron gun under vacuum through to potential wells in atmosphere. An array of insulating posts formed in or on the CTP support a deformable reflecting membrane that spans the wells. The CTP serves as a high-density multi-feedthrough vacuum-to-air interface that both decouples the electron beam interaction from the membrane and provides the structural support required to hold off atmospheric pressure. The vacuum-to-air interface allows the reflective membrane to be built and operated in air rather than a vacuum, which is simpler and cheaper.

However, because the CTP provides structural integrity sufficient to withstand atmospheric pressure, the CTP must be very thick, at least 3 mm for useful display sizes. In order to preserve the resolution of the deposited charge pattern, the rule-of-thumb is that the charge plane should be preferably within one-tenth the width of the pixel and no greater than ten times the width. At large distances, the fringing forces will washout the resolution of the attractive electrostatic forces. Even assuming a fairly large pixel size of 0.1 mm the charge plane could be no greater than 1 mm away and preferably about 10 microns. To effectively move the charge plane closer to the membrane, Warde forms conductive feedthroughs in the CTP to transfer the charge pattern from the backside of the CTP to the wells, which are nominally spaced 2–10 microns from the membrane.

Although the feedthroughs solve the proximity problem they dramatically reduce the amount of charge delivered to the wells. Since charge distributes itself uniformly around the cylindrical feedthrough and the area of one end of a feedthrough might be $\frac{1}{1000}$ its total surface area for these dimensions, the amount of charge delivered to the well is reduced by approximately $\frac{1}{1000}$. Thus, the scanning electron gun has to deliver approximately 1000 times the charge needed to actuate the membrane. The higher the current density the larger the beam spot size, hence the lower the resolution of the display.

In the early 1970s, Westinghouse Electric Corporation developed an electron gun addressed cantilever beam deformable mirror device, which is described in R. Thomas et al., "The Mirror-Matrix Tube: A Novel Light Valve for Projection Displays," ED-22 IEEE Tran. Elec. Dev. 765 (1975) and U.S. Pat. Nos. 3,746,911, 3,886,310 and 3,896,338. The device is fabricated by growing a thermal silicon dioxide layer on a silicon-on-sapphire substrate. The oxide is patterned in a cloverleaf array of four centrally joined cantilever beams. The silicon is isotopically wet-etched until the oxide is undercut, leaving four oxide cantilever beams within each pixel supported by a central silicon support post. The cloverleaf array is then metallized with aluminum for reflectivity. The aluminum deposited on the sapphire substrate forms a reference grid electrode near the edges of the mirrors that is held at a d.c. bias. A field mesh is supported above the mirrors to collect any secondary electrons that are emitted from the mirrors in response to the incident primary electrons.

The device is addressed by a low energy scanning electron beam that deposits a charge pattern on the cloverleaf beams, causing the beams to be deformed toward the reference grid electrode on the substrate by electrostatic actuation. Erasure is achieved by holding the deposited charge on the mirror throughout the frame time and then raising the target voltage to equal the field mesh potential while flooding the tube with low energy electrons to simultaneously erase all of the mirrors. This approach increases the modulator's contrast ratio but produces "flicker", which is unacceptable in video applications.

To allow deformation of the cloverleaf beams with reasonable amounts of charge deposited by the scanning electron beam, Westinghouse must make the cloverleaf beams thin and pliable. Also, in order to avoid a crystal grain structure that would reduce reflectivity by 10–15%, Westinghouse must use a very thin aluminum coating on the cloverleaf beams. As a result, the electron beam energy must be relatively low so that substantially all of the electrons are stopped in the mirror and do not penetrate through to the underlying glass substrate. Unfortunately, low energy beams exhibit relatively large spot sizes, which reduces resolution.

A thicker mirror could be used in combination with a high-energy electron beam to stop the incident electrons and maintain high resolution. However, to ensure quality video performance, the fundamental mechanical resonance of the mirror must exceed the video rate by approximately a factor of one hundred to allow the mirror to be fully settled. Resonance frequencies of 5–10 kHz are suitable. As a result the hinge formed at the juncture of the cloverleaf beams and support post would have to be fairly strong, i.e. thick. Since, the spring force of the hinge, which opposes the deflection of the beam, increases as the cube of its thickness a lot more charge would have be deposited on the beam to produce adequate force. Electron guns capable of delivering sufficient current in a one-pixel dwell time with a small spot size are currently beyond the state of the art.

The persistent snap-over problems and limited contrast ratio has, to date, kept micromirror light modulators from exploiting their inherent optical power advantages over CRT, liquid crystal and reflective membrane based technologies and dominating the market. In fact, the problem has been so onerous that the light modulator industry has invested considerable time and money to develop a digital mode of operation for these attractive-mode devices and alternate actuation technologies.

Texas Instruments has pioneered the development of the digital-mode light modulator with its digital micromirror device (DMD) that uses the pull-in problem to its advantage. The DMD employs a torsional micromirror that rocks back-and-forth between binary positions with the tips of the mirror being pulled down to the base electrodes. The "sticking" effect is diminished, but not eliminated, by only touching the tip of the mirror to the base electrode and by using anti-stick coatings. Time division multiplexing (TDM), created by rapidly rocking the mirror back-and-forth between its two positions, is used to establish different gray-levels. The electronics for implementing a TDM addressing scheme are much more complex and expensive than those required for analog modulation. Furthermore, the anti-stick coatings complicate the device and increase production costs significantly.

Aura Systems has developed a micromirror light valve target in which electrostatic actuation has been replaced with piezoelectric actuation. The micromirrors are formed on top of piezoelectric pedestals. DC voltages are applied to the pedestals, which causes them to change shape and tilt the mirrors. Although piezoelectric actuation avoids pull-in, the fabrication process is complex and expensive, the deflection angles arc small, and high voltages switched at high frequencies are required to actuate the pedestal.

SUMMARY OF THE INVENTION

In view of the above problems, the present invention provides a high-resolution charge controlled mirror (CCM) with increased deflection range, reduced beam current and improved electrostatic stability.

This is accomplished by inserting a thin insulating membrane into a vacuum cell that decouples the electron beam from a micromirror array held at reference potential. The membrane is just thick enough to stop the incident electrons from penetrating through to the mirrors but is thin enough that the fringing fields are minimized and do not affect resolution. In fact the membrane is so thin that it cannot support itself against the applied electric field due to the induced charge pattern and must be supported by an array of insulating posts. Decoupling the micromirrors from the beam allows them to be thinner, which in turn reduces the hinge thickness required to maintain adequate resonant frequencies, which in turn reduces the amount of beam current required to deflect the micromirror. At high resolutions, the beam dwell time is very short so charge efficiency is very important.

In a preferred embodiment, an equipotential layer beneath the array shields the mirrors from accumulated static charge and prevents any attractive force from being developed that may otherwise cause the mirror to snap-over and become stuck to the substrate. In addition, an array of attractor pads can be formed on the membrane to improve the resolution of the overall electric field and improve the field uniformity seen by each micromirror. Furthermore, a complementary array of attractor pads can be patterned on the frontside of the membrane to define an array of series capacitors. Charge deposited on the backside pad produces mirror charges on the opposite frontside pad. As a result, the charge pattern is effectively shifted onto the frontside of the membrane thereby increasing the electric field for a given amount of charge.

Limited deflection range is overcome by supporting the thin membrane on a post array above the micromirrors and defining an attractor pad geometry that allows up to about 83% of the mirror-to-membrane spacing to be used. Snap-over to the membrane can be avoided by biasing the CCM so that the grid potential, which determines the maximum membrane potential, is less than the snap-over threshold potential. In addition, the mirrors can be biased downward thereby effectively increasing the deflection range. This can be done by forming small holes in the equipotential layer beneath the mirrors and applying a heavily filtered bias potential to a buried layer to produce a very stable attractive force.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 4 is a plan view of the perforated membrane and attractor pad configuration;

FIGS. 5a and 5b are respectively section views of the membrane-actuated CCM in the write and erase modes in a dual-beam addressing scheme;

DETAILED DESCRIPTION OF THE INVENTION

Figure 1A:
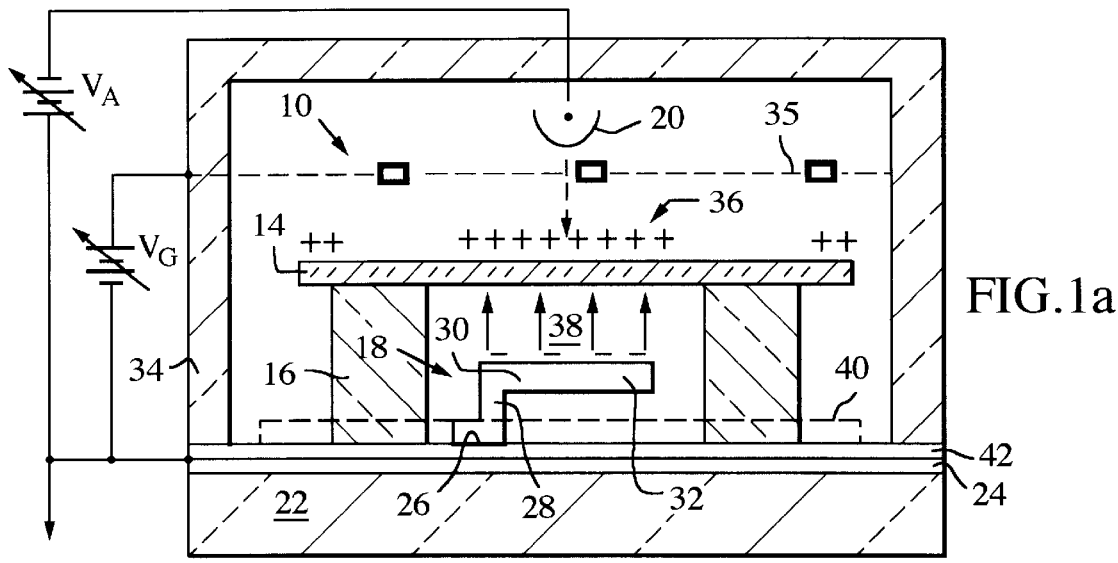
FIGS. 1a through 1c are schematic illustrations of one pixel of a membrane-actuated CCM in accordance with the present invention.

The present invention provides a CCM configuration that overcomes the problems of limited deflection range, high beam current, electrostatic instability and limited resolution associated with known electrostatically-actuated micromirror targets. This is accomplished by inserting a thin insulating membrane into the vacuum cell to decouple the electron beam from the micromirror array. Decoupling also allows the mirror to be designed to optimize reflectivity, exhibit a higher resonant frequency for better video performance, and be fabricated simultaneously with the hinges. The electron beam source can be a single electron gun, a pair of electron guns or a fixed beam array such as a field emitter array (FEA), a Thin CRT, a surface conduction electron (SCE) array or a metal-insulator-metal (MIM) cathode array.

Limited deflection range is overcome by supporting the thin membrane on a post array above the micromirrors and defining an attractor pad geometry on the membrane that allows up to 83% of the mirror-to-membrane spacing to be used. Snap-over can be avoided by biasing the CCM so that the grid potential, which determines the maximum membrane potential, is less than the snap-over threshold potential. The maximum membrane potential may exceed the grid potential slightly with the exact difference depending on the low energy spectrum of the secondary electrons and the geometry of the attractor pads and collector grid. In addition, the mirrors may be biased downward thereby effectively increasing the deflection range. A bias causes the mirror to deflect up and down with respect to its neutral position, which has the desired effect of preventing certain kinds of hinges from developing an offset due to their crystal grain structure over time.

The problems of electrostatic instability are overcome by forming an equipotential layer beneath the mirror array that holds all of the mirrors at a reference potential, suitably the anode potential. Since the equipotential layer is at the same potential as the mirrors no attractive force can be created between the two. As a result, the equipotential layer effectively shields the micromirrors from any accumulation of static charge on the substrate and conducts away any stray charge on the substrate.

Improved resolution and reduced beam current are primarily attributable to decoupling the beam from the mirror array. Although the membrane is quite thin it is thicker than the optimum mirror thickness. As a result, a higher energy beam can be used. Higher energy beams have smaller spot sizes, which improves resolution. In addition, a lower current beam can be used because the mirror thickness and thus hinge thickness can be reduced, which reduces the amount of charge needed to deflect the mirror. Lower current beams also have smaller spot sizes, which again improves resolution.

Improved resolution is also attributable to the design of the membrane. Because the membrane is so thin, the spacing between the charge pattern on the membrane and the mirrors is approximately the mirror-to-membrane spacing. Even for large deflection ranges and small mirrors, this spacing is small enough that the fringing field effects on resolution are small. Resolution may be increased up to two-fold by proper beam modulation in combination with attractor pads on the membrane. These pads also serve to create a uniform electric field for each mirror. Lastly, the charge pattern can be shifted to the other side of the membrane without diluting the amount of charge by forming an array of complementary attractor pads on the frontside of the membrane to define series capacitors. Charge deposited on the backside is mirrored to the frontside. This not only moves the charge pattern closer but also moves it to the other side of the membrane, which has a dielectric constant several times that of air.

For purposes of explanation, the invention will first be described in the context of a single pixel, which illustrates the geometry and functionality of the membrane actuated CCM. As shown in FIG. 1a, a CCM 10 includes a thin insulating membrane 14 that is supported on a post array 16 between a pivotable micromirror 18 and a source of primary electrons. Post array 16 and micromirror 18 are formed on a transparent substrate 22, which may be covered with a passivation layer 24. In certain configurations, it may be possible to form the post array between the membrane and the source. For example, if the source is a fixed emitter array the post and membrane structure can be built up on top of the array. Each micromirror includes a conductive post region or pad 26, a post 28, a hinge 30 and a mirror element 32. Hinge 30 and mirror element 32 are preferably coplanar and of the same thickness. CCM 10 resides entirely within a vacuum cell 34 although substrate 22 may, as shown, form the cell's faceplate.

In the preferred configuration, a conductive grid 40, which includes post pads 26, is formed on a very thin transparent equipotential layer 42, suitably 100 Å or less of transparent conducting film or oxide (TCF or TCO) on substrate 22. Layer 42 prevents a potential difference from being developed between the mirrors and substrate that could otherwise cause instability. Grid 40 ensures electrical continuity between all of the micromirrors and holds them all at reference potential, suitably anode potential. Layer 42 could perform both functions, but would have to be much thicker to ensure electrical continuity, which would reduce optical efficiency.

The potential difference between collector grid 35, biased a relatively positive potential $V_G$, and micromirror 18 establishes a uniform electric field 38. The attractive force exerted on the mirrors by the collector grid causes negligible mirror deflection due to their relatively large spacing. Membrane 14 resides at a floating potential within electric field 38. In the absence of any deposited charge, the membrane potential stabilizes at a potential between the reference potential and the collector grid potential such that it satisfies the electric field between the mirror array and grid. The exact value of the membrane potential depends on the dielectric constant of the membrane and its thickness, and the geometry of the collector grid and mirror array and their relative spacing to the membrane. Since the membrane is much closer to the mirror array, its initial potential will be close to the reference potential. Regardless, the membrane is preferably brought to a desired erase potential as part of a start up sequence to bring the mirrors to an erase state.

To write a charge pattern 36 onto micromirror 18, source 20 emits primary electrons that are accelerated by the anode potential $V_A$ through collector grid 35 and strike the backside of membrane 14 causing secondary electrons to be ejected and collected by the collector grid. The source is operated at a beam energy at which the number of secondaries ejected is different than the number of incident primaries.

Suitably, the membrane is coated with a secondary emission material such as MgO that exhibits an emission coefficient, i.e. the ratio of emitted secondary electrons to incident primary electrons, much larger than unity at the beam energy. This reduces the amount of beam current that is required to write charge pattern 36 onto membrane 14.

The deposition of charge pattern 36 onto membrane 14 modulates the potential of each pixel with respect to the erase potential. With the coated membrane, charge pattern 36 exhibits a net positive charge that increases the localized membrane potentials with respect to the mirror array's erase state potential. This in turn increases the electric field 38 between the membrane and the micromirror and produces attractive forces that tend to pivot and deflect mirror element 32 outward away from substrate 22 and towards the membrane. The attractive force is opposed by the hinge's spring force and the amount of deflection is determined by the force rebalance equation for a given geometry. The mirror deflection in turn imparts a modulation onto a beam of light.

In general, the more deposited charge, the stronger the electric field and the larger the deflection. Should the potential difference between the membrane and the micromirror exceed the snap-over threshold potential, which is determined by the mirror geometry and hinge compliance, the mirror will snap-over and become stuck to the membrane. Snap-over can be avoided by providing a relatively large mirror-to-membrane spacing and using only a fraction of the available deflection range or by biasing the collector grid potential $+V_G$, which determines an upper bound on the membrane potential, below the threshold potential such that $V_G+V_B<$Vth. $V_B$ represents a safety margin to account for the fact that the membrane potential may slightly exceed $+V_G$ due to the low energy spectrum of the secondary electrons and the electrode geometry.

A number of techniques are available to erase charge pattern 36 from membrane 14. As mentioned above, the membrane potential is brought to some erase potential so that all of the pixels have the same potential and deflection. For example, the membrane potential could be returned to its floating potential equilibrium by allowing the charge to bleed off. The entire collector grid or segments thereof can be switched to anode potential and scanned thereby driving the membrane potential to the anode potential. If the mirror array is held at anode potential, the mirrors will be erased to their neutral position. Conversely if the mirror array is held at grid potential, the mirrors will be erased to their maximum deflected state. Furthermore, a pair of guns, operating at energies where the coated membrane's secondary emission coefficients are respectively greater than and less than unity, can be used to first drive the membrane potential to the erase potential to erase the charge pattern and then selectively adjust the pixel potentials to rewrite a new charge pattern. This same effect can be realized by forming a control pad on each pixel having the opposite electron affinity and then scanning the membrane with a single gun.

In this CCM configuration, the thickness of substrate 22, membrane 14 and mirror 18 are selected to perform different functions. Assuming substrate 22 defines the cell's faceplate, its thickness must provide enough strength to hold off atmospheric pressure. A thickness of 2–3 mm is common. Since the mirrors are decoupled from the beam they can be made extremely thin, 2000–3000 Angstroms thick, and simultaneously with the hinges. As mentioned previously, this can improve reflectivity and reduces the force required to deflect the mirror due to high hinge compliance.

Membrane 14 must be at least thick enough to stop the incident electrons from penetrating through to the micromirrors and resilient enough to resist being torn off the post array. Typically, membrane materials of interest require about 1000 Angstroms per kilovolt of beam energy to stop electrons, where beam energies of 5–10 Kv are reasonable. However, as discussed above, a thin membrane is desirable to improve charge efficiency and maintain resolution as well as for cost and fabrication reasons. A membrane thickness of one to two microns seems to provide a reasonable balance, although thinner membranes would be preferred. Note, unlike Warde's CTP, membrane 14 is so thin that it cannot support itself against the applied electric field due to the induced charge pattern much less hold off atmospheric pressure.

Figure 1B:
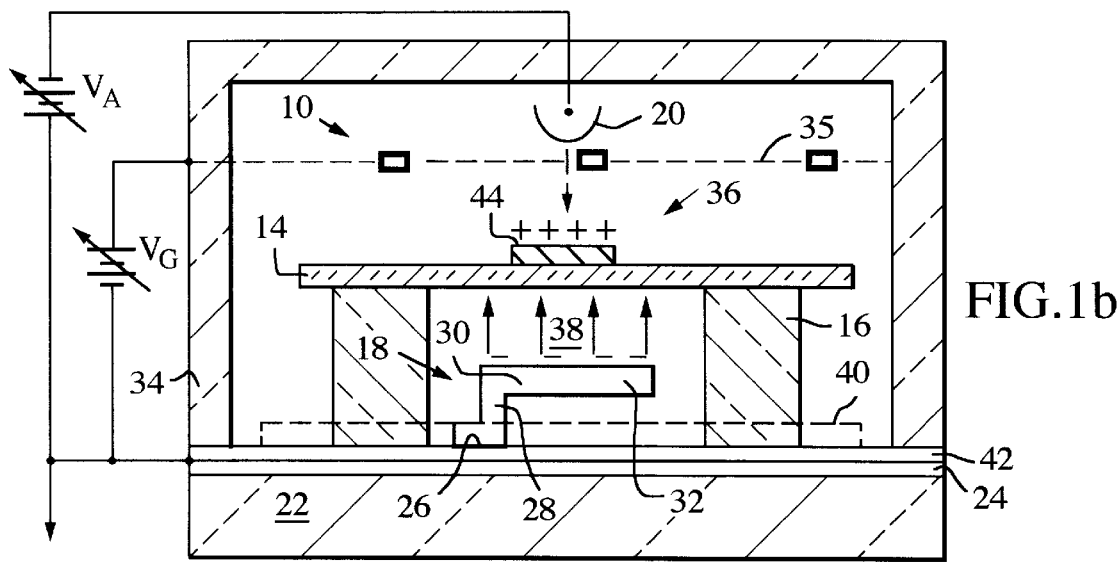
Figure 1C:
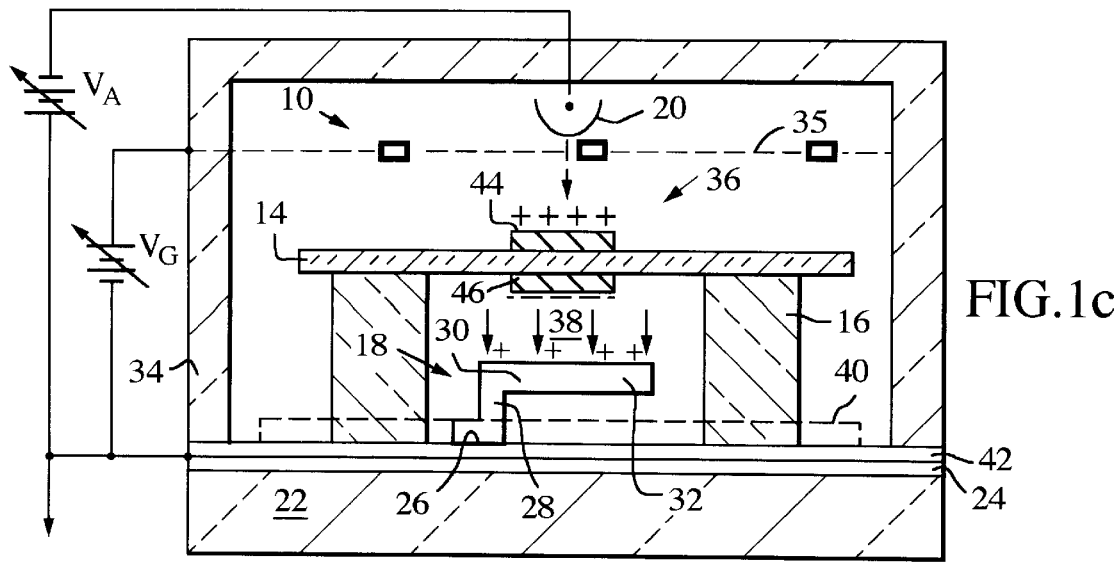

As shown in FIG. 1b, the backside of membrane 14 can be patterned with an array of electrically-isolated attractor pads 44 which serve several purposes. First, the deposited charge will distribute itself uniformly across the surface of the pad thereby providing a more uniform electric field for actuating the underlying mirror. Second, using techniques known to the CRT industry the beam can be modulated to achieve a resolution that is finer than its spot size. Lastly, the pad geometry can be configured with respect to the mirror geometry so that the useable deflection range is approximately 83% of the mirror-to-membrane spacing As shown in FIG. 1c, the addition of a bottom attractor pad 46 forms a series capacitor that has the added benefit of effectively transferring the charge 36 deposited on the backside of the membrane to the frontside of the membrane without reducing the amount of charge seen by the mirror. The deposition of charge onto top pad 44 causes an equal number of mirror charges to accumulate on bottom pad 46. Although membrane 14 is thin, the series capacitor will effectively move the charge pattern at least 20–30% closer (depending upon the membrane's dielectric constant) for a 10 micron mirror-to-membrane spacing and a 1–2 micron membrane. Since the force on the mirror is proportional to the square of the electric field (voltage/distance), this can have a measurable impact on the amount of mirror deflection achieved per unit of beam current. The benefit is even greater because the membrane's dielectric constant is removed from the equation. In addition, the symmetry provided by the bottom pads reduces the lateral stresses on the thin membrane.

Figure 2:
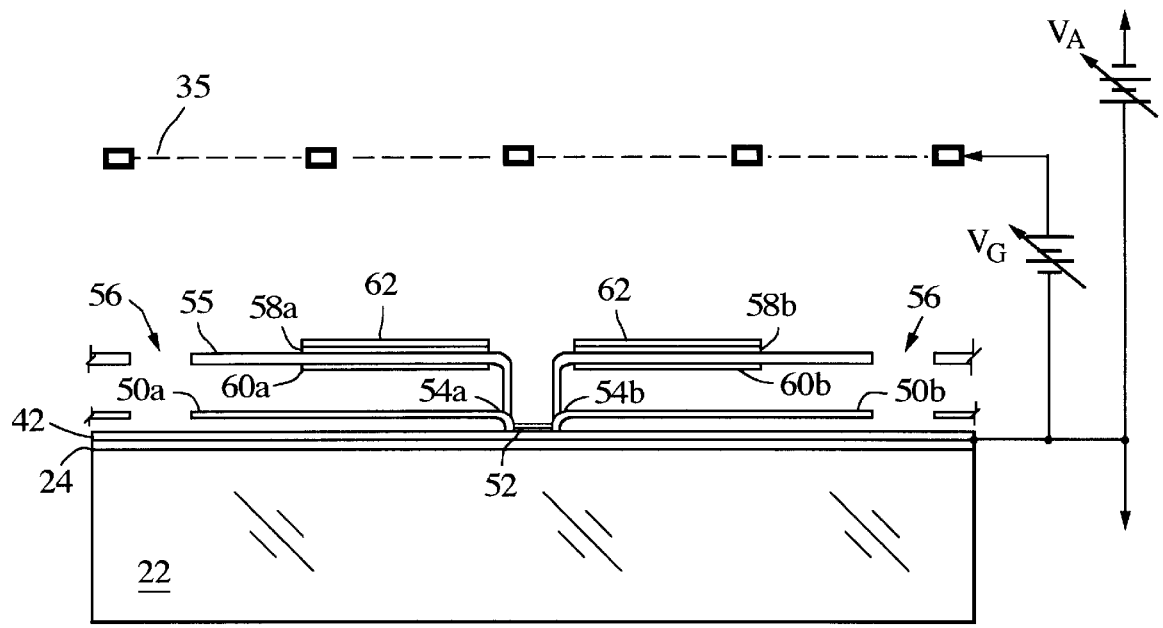
FIG. 2 is a sectional view of a currently preferred embodiment of a membrane-actuated CCM with a cloverleaf mirror structure and perforated membrane.
Figure 3:
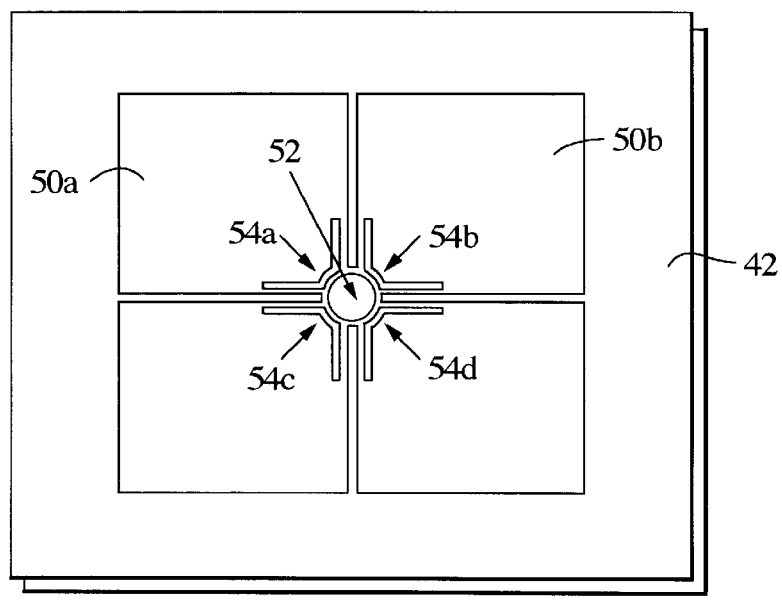
FIG. 3 is a plan view of the cloverleaf mirror structure with a common central post shown in FIG. 2.

A currently preferred embodiment of the micromirror array and post-membrane structure is depicted in FIGS. 2, 3 and 4. In this configuration the mirror layer is patterned in a cloverleaf array of four centrally joined cantilever beams 50a, 50b, 50c and 50d that share a common post region 52. The mirror layer is also patterned to define torsional flexion hinges 54a, 54b, 54c and 54d that join the respective cantilever beams to post region 52. Although other hinge designs are available, the torsional hinge is preferred because it gives higher compliance for a given fill factor.

The posts 16 and membrane 14 are formed as an integral gull-wing shaped structure 55 in which the posts 16 are located on the mirror's common post region 52. Membrane 14 has a number of vent holes 56 that are spaced between cloverleaf arrays and used during processing to simultaneously release the micromirrors and membrane. This configuration allows the post to be relatively large in diameter with a smaller aspect ratio, which is desirable for fabrication considerations, without significantly reducing fill factor.

Other multi-petal configurations are certainly within the scope of the invention.

For example, a color display may use three petal RGB structures.

Top attractor pads 58a, 58b, 58c and 58d and the bottom attractor pads 60a, 60b, 60c and 60d are patterned on either side of membrane 14 to lie directly above the respective cantilever beams 50a, 50b, 50c and 50d. As shown, the diagonal of the attractor pads is approximately 60% of that of the underlying cantilever beam. This allows the cantilever beam to be deflected over approximately 83% of the mirror-to-membrane spacing without snap-over. To enhance charge efficiency, the top attractor pads are coated with a secondary emission material 62 that exhibits an emission coefficient greater than one at the desired beam energy.

As illustrated, the four attractor pads are electrically isolated from one another. As a result, each cloverleaf structure represents four distinct pixels. In some applications it may be desirable to short the attractor pads together and treat each cloverleaf structure as a single pixel. This defines a larger pixel that is easier for the beam to address.

The CCM illustrated in FIGS. 2,3 and 4 is fabricated on a glass substrate that is coated with a TCO or TCF layer by using a five-mask process. A layer of photoresist is patterned using mask 1, a mirror release mask, to form the release layer for the micromirror array. The release layer is then coated with aluminum and patterned using mask 2, a mirror metal mask, to define the micromirror array and conductive grid. A second thicker layer of photoresist is patterned using mask 3, a membrane release mask, to form the release layer for the post-membrane structure. Prior to depositing the post-membrane layer, the bottom attractor pads are patterned on the release layer using mask 4, an attractor pad mask. After deposition, an attractor mask 4 is reused to pattern the top attractor pads on the membrane. Lastly, the vent holes are patterned in the membrane between cloverleaf structures using mask 5, a membrane vent mask. At completion of processing and prior to release, the substrate is diced into individual micromirror arrays. Thereafter, the mirror and post-membrane release layers are simultaneously released to leave the free-standing structure shown in FIGS. 2, 3 and 4.

Figure 5B:
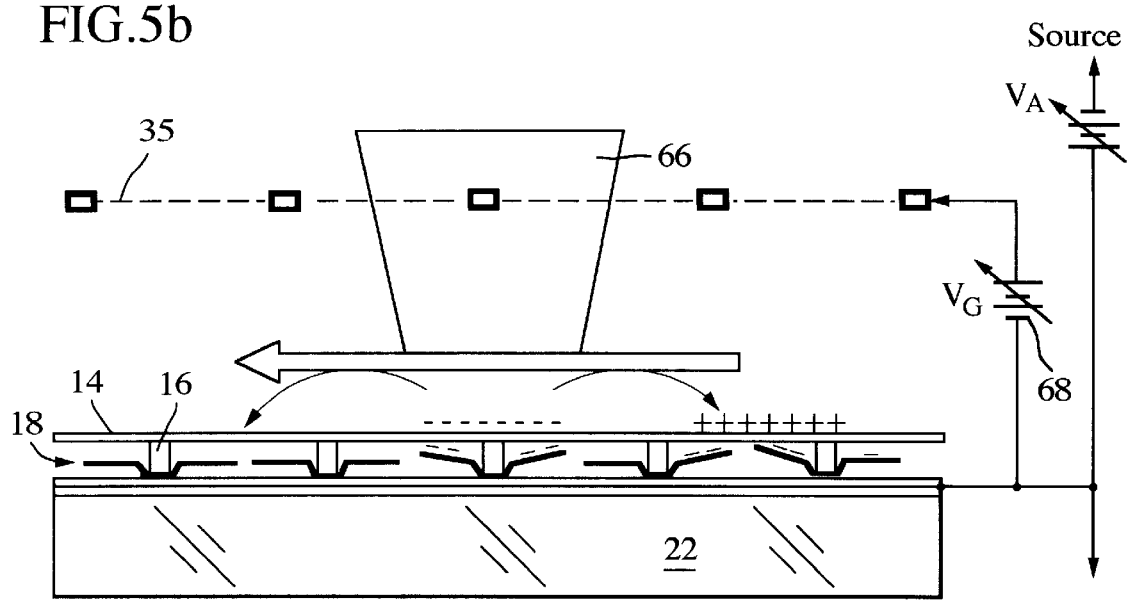

As mentioned previously, the charge pattern can be written and erased in a number of different ways. One specific dual-beam addressing scheme is illustrated in FIGS. 5a and 5b. Although illustrated in conjunction with a solid membrane 14 that is supported on discrete posts 16 and not patterned with attractor pads, the addressing scheme is generally applicable to membrane-actuated CCMs. To improve frame time utilization (FTU), collector grid 35 is segmented into four or more electrically isolated segments. The FTU is (n−2)/n where n is the number of segments. A pair of scanning electron guns, which are biased at a potential $-V_A$ with respect to the reference, raster scan membrane 14 with the write beam 64 lagging the erase beam 66 by two segments. A controller 68 that is synchronized to the beams, switches the potentials on the grid segments between anode potential and $+V_G$.

In both cases, the beam causes secondary electrons to be ejected from membrane 14. When the grid segment potential is switched to anode potential, the secondaries are not attracted to collector grid 35 and will redeposit themselves over membrane 14 thereby erasing the charge pattern as shown in FIG. 5b. Conversely, when the grid segment is switched to $+V_G$, the secondaries will be collected by the $+V_G$ segment of the collector grid thereby writing a new charge pattern 36 as shown in FIG. 5a. Since both guns preferably operate between the first and second crossover points on the membrane's secondary emission curve, image resolution can be further improved by coating the entire surface of the membrane with a high secondary emission coefficient material such as magnesium oxide (MgO). The coating acts as a current amplifier, which permits lower beam current for a given charge pattern.

The membrane-actuated micromirror technology described above can be used in many different image display systems including, but not limited to, projection systems, non-emissive direct-view systems, i.e. "white paper" and flat-panel emissive systems.

The white paper and flat-panel systems may require modified mirror geometries to accommodate direct-view.

Figure 6:
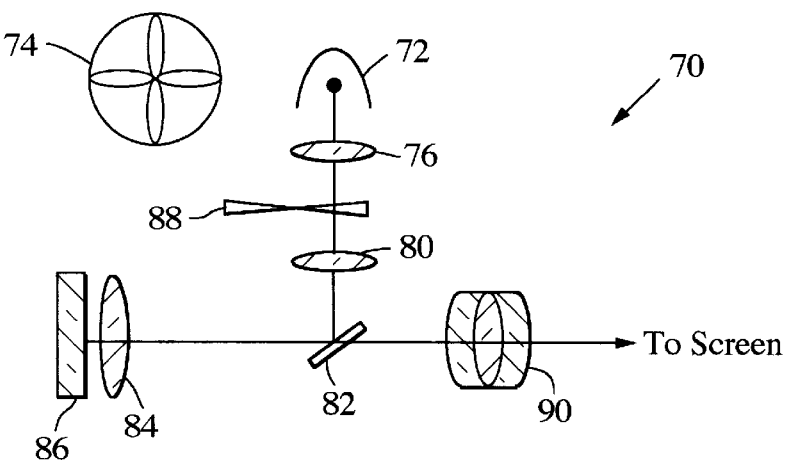
FIG. 6 is a schematic drawing of a projection display incorporating the dual-beam addressing scheme shown in FIGS. 5a and 5b.

As shown in FIG. 6, a monochrome projection display 70 includes a bright light source 72 such as an arc lamp with a reflector and a cooling fan 74. The arc lamp produces divergent light, which is collimated by collection optics 76, selected to absorb the ultraviolet component of the light. A condenser lens 80, which focuses the collimated light onto a turning mirror/Schlieren stop 82. The turning mirror redirects the now diverging light onto a field lens 84, which recollimates the light and images it onto a dual beam addressed membrane-actuated micromirror light modulator 86 of the type described above. A color display can be implemented by positioning an RGB color wheel 88 between collection optics 76 and lens 80. This is commonly referred to as color sequential.

Light modulator 86, in response to a video addressing signal, imparts a spatial modulation onto the light in proportion to the amplitude of the deflection of the individual micromirrors. As shown, light modulator 86 implements a dual-beam addressing scheme of the type discussed in FIGS. 5a and 5b. The spatially modulated light passes back through field lens 84 where it is focused onto a plane that extends through turning mirror/Schlieren stop 82. The Schlieren stop converts the spatially modulated beam into an intensity modulated beam that is then passed through a projection lens 90, which collimates the intensity modulated light and images it onto a screen.

Figure 7:
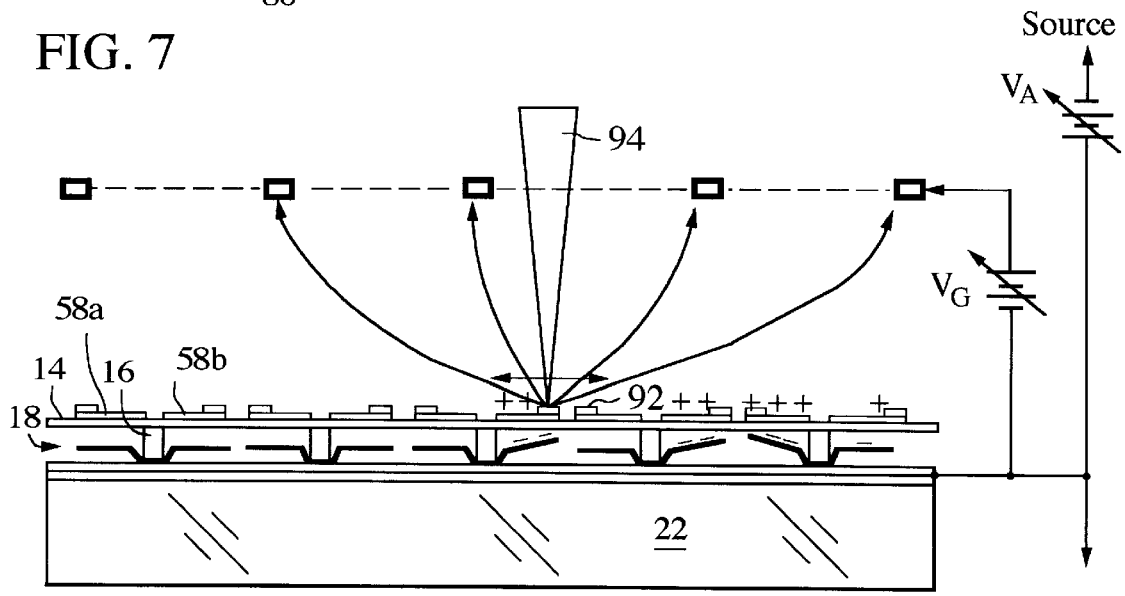
FIG. 7 is a sectional view of a single-beam addressing scheme for the CCM.

As shown in FIG. 7, the membrane-actuated CCM can be modified so that addressing can be done with a single beam with FTU approaching 100% and without segmenting the collector grid or switching its potential. This is accomplished by only partially coating attractor pads 58a–58d with a secondary emission material to define control pads 92. A source, which is biased at $-V_A$ with respect to the reference, emits a subpixel resolution beam 94 that selectively addresses each pixel's control pad 92 and attractor pad 58 to write a charge pattern onto the attractor pad. Although described in conjunction with the solid membrane structure shown in FIG. 1, this modification is equally applicable to the integrated gull-wing structure depicted in FIGS. 2 and 3.

Figure 8:
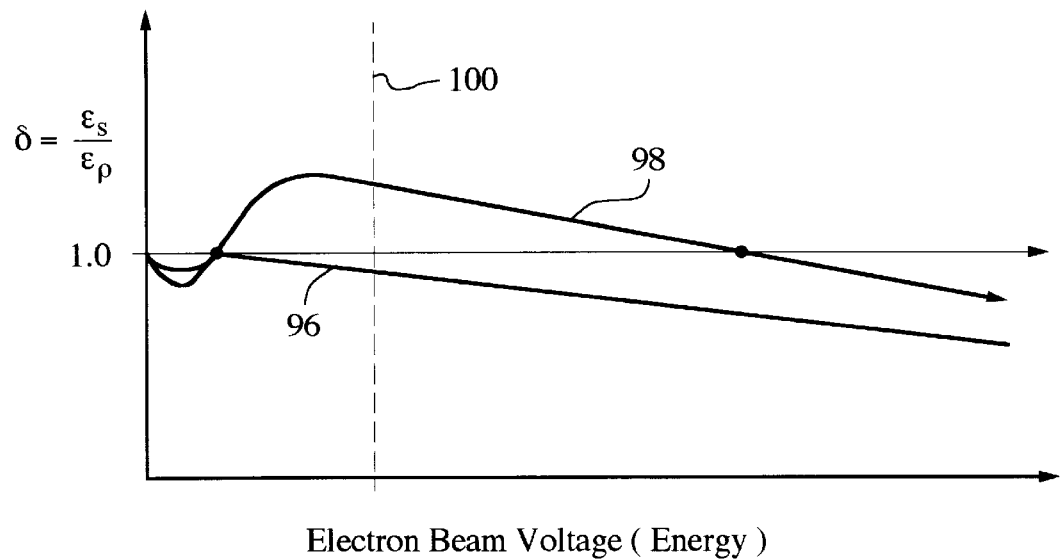
FIG. 8 is a plot of the secondary electron emission curves for the mirror and control pad materials shown in FIG. 7.

The secondary electron emission curves, 96 and 98, for typical attractor and control pad materials, respectively, are shown in FIG. 8. The curves plot the ratio δ of secondaries emitted to incident primaries against the landing energy of the primary electrons. At landing energies between first and second crossover points (δ=1), the control pad material, suitably degassed MgO, has a coefficient greater than one. Outside that region, the material exhibits a coefficient less than one. The attractor pad material, suitably degassed aluminum film, has a coefficient that is always less than one. As a result, with proper selection of the attractor and control pad materials and a beam energy 100, each pixel comprises a first portion that has an emission coefficient greater than one for a predetermined beam energy and a second portion that has an emission coefficient less than one for the same beam energy.

Two different modes of writing the charge pattern onto the pixelized membrane are currently contemplated; a differential write mode and an erase/write mode. In the differential write mode, the current pixel value is stored in memory and the next pixel value is written by addressing either the attractor pad or the control pad. In the erase/write mode, the beam is first directed onto either the attractor pad or the control pad to drive the pixel potential to a desired erase potential, i.e. the erase state. The beam is then directed onto the other pad to adjust the pixel potential away from the erase potential, i.e. the write state. In either case, FTU approaches 100%.

In a specific example of the erase/write mode, the beam is first directed onto the control pad, δ>1, so that the pixel potential rises until it equals the grid potential where it reaches equilibrium. This is the erase state, which corresponds to a maximum mirror deflection when the mirrors are held at anode potential. Immediately thereafter the beam is directed onto the attractor pad, δ<1, so that the pixel potential is reduced until it and the deflection angle reaches the desired value. The charge is then held on the pixel until the next frame.

Figure 9:
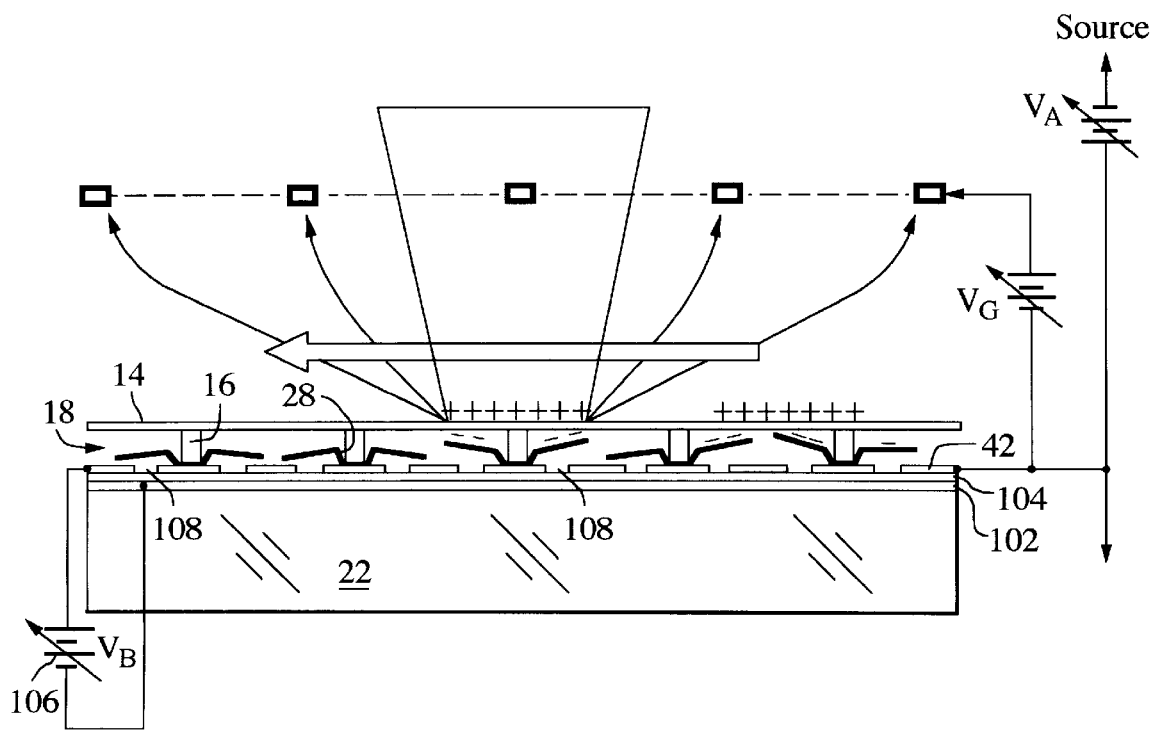
FIG. 9 is a sectional view of another embodiment of a membrane-actuated CCM with increased deflection range.

As shown in FIG. 9, the basic membrane-actuated CCM can also be modified to substantially increase the deflection range. This is accomplished by first increasing the substrate-to-membrane spacing by increasing the height of posts 16 and extending the mirror posts 28 so that mirrors 18 lie about halfway between the substrate and membrane 14. This provides enough space for the mirror to deflect without experiencing snap-over to either the substrate of the membrane. Although described in conjunction with the solid membrane structure shown in FIG. 1, this modification is equally applicable to the integrated gull-wing structure depicted in FIGS. 2 and 3.

A buried conductive layer 102 and a spacer layer 104 are formed on substrate 22 beneath layer 42. A bias potential 106 is applied between buried layer 102 and TCF or TCO layer 42 so that the potential on buried layer 102 is less than the reference potential on layer 42 and the micromirror array. In order for the individual mirrors to "see" this constant electric field, layer 42 is patterned with an array of holes 108 beneath the micromirrors. In order to mimic the geometry of the attractor pads, the holes 108 are preferably spaced back from the tip of the mirror.

The electric field acting through holes 108 exerts a force on the mirrors that attracts them toward the substrate. Absent any attractive force from the membrane, all of the micromirrors are held down with a bias deflection. Because the bias potential 106 is constant it can be heavily filtered to prevent any noise from producing a transient force that would cause snap-over. When charge is written onto the membrane, the membrane will exert an opposing attractive force that tends to deflect the mirror upward toward the membrane. In addition to the extended range of deflection, deflecting the mirror in both directions with respect to its natural mechanical rest position will reduce the amount of asymmetric stress on the hinge and can increase the performance and lifetime of the hinges.

While several illustrative embodiments of the invention have been shown and described, numerous variations and alternate embodiments will occur to those skilled in the art. For example, a field emitter array can be used in place of the scanning electron gun to address the membrane-actuated CCM. Such variations and alternate embodiments are contemplated, and can be made without departing from the spirit and scope of the invention as defined in the appended claims.

We claim:

1. A light modulator, comprising:

a vacuum cell;

a transparent substrate in said vacuum cell an array of electrostatically-actuable pivotable micromirrors on said substrate, said array being held at an reference potential;

an array of insulating posts supported in said vacuum cell;

a thin floating-potential insulating membrane that is supported by said posts above said array of micromirrors;

a collector grid in said vacuum cell that is spaced apart from said insulating membrane opposite said array; and a source in said vacuum cell that emits primary electrons that are accelerated toward said reference potential through said collector grid and strike the backside of said insulating membrane causing secondary electrons to be ejected and collected on the collector grid thereby leaving a predetermined charge pattern on said membrane that produces finely-resolved attractive electrostatic forces that cause said micromirrors to pivot and deflect towards the membrane, said membrane being thick enough to stop said primary electrons from penetrating through to said micromirrors and thin enough that the fringing fields between the charge pattern and the micromirrors do not degrade the resolution of the attractive electrostatic forces.

2. The light modulator of claim 1, wherein said transparent substrate forms a faceplate of said vacuum cell.

3. The light modulator of claim 1, further comprising a transparent equipotential layer between said substrate and said array of micromirrors that shields said micromirrors from charge accumulation on said transparent substrate.

4. The light modulator of claim 3, further comprising a conductive grid on said equipotential layer that ensures electrical continuity between said micromirrors.

5. The light modulator of claim 3, wherein said equipotential layer has an array of holes beneath respective micromirrors, further comprising:

an insulative layer beneath said equipotential layer; and a buried conductive layer between said insulative layer and said substrate that is held at a constant potential, said constant potential creating an electric field through said holes with respect to said reference potential that establishes a constant attractive force on said micromirrors that biases them downward toward said substrate.

6. The light modulator of claim 5, wherein each said micromirror has a conductive post that extends from said substrate up to approximately one-half the substrate-to-membrane spacing, said insulating posts extending from said conductive posts to said membrane.

7. The light modulator of claim 1, further comprising:

an array of attractor pads on the backside of said membrane that are aligned with said array of micromirrors, said source writing said charge pattern onto said attractor pads such that each micromirror's charge is distributed uniformly across the corresponding attractor pad.

8. The light modulator of claim 7, further comprising:

an array of attractor pads on the frontside of said membrane facing and aligned with said array of micromirrors, said attractor pads on the membrane's backside and frontside forming an array of series capacitors so that charge deposited on said backside attractor pads produces mirror charges on said frontside attractor pads opposite said micromirrors.

9. The light modulator of claim 7, wherein said attractor pads are coated with a secondary emission material that exhibits a secondary emission coefficient greater than one.

10. The light modulator of claim 7, wherein said attractor pads exhibit a secondary emission coefficient less than one, further comprising an control pad that exhibits a secondary emission coefficient greater than one on each said attractor pad.

11. The light modulator of claim 1, wherein each said micromirror comprises:
- a conductive post that spaces said micromirror apart from said substrate;
- a hinge that allows said micromirror to pivot and deflect upward toward the membrane in response to the attractive electrostatic forces; and
- a reflective surface for deflecting a beam of light,
- said hinge and said reflective surface being coplanar and having the same thickness, which in the absence of said membrane would be too thin to stop the primary electrons.

12. The light modulator of claim 1, wherein said charge pattern increases the localized membrane potentials toward the grid potential so that the potential differences between the membrane and the micromirrors produces the finely-resolved attractive electrostatic forces, said micromirrors being susceptible to snap-over when the potential difference exceeds a threshold potential, said collector grid being biased so that said grid potential is less than said threshold potential.

13. A light modulator, comprising:
- a vacuum cell;
- a charge controlled mirror (CCM) mounted in said vacuum cell, comprising,
  - a transparent substrate;
  - a transparent equipotential layer on said transparent substrate;
  - an array of electrostatically-actuable pivotable micromirrors on said equipotential layer that are both held at an reference potential;
  - an array of insulating posts on said substrate;
  - a floating-potential insulating membrane supported by said posts above said array of micromirrors; and
  - a collector grid spaced apart from said insulating membrane opposite said micromirrors; and
- a source that emits primary electrons that are accelerated through said collector grid and strike portions of said insulating membrane above respective micromirrors causing secondary electrons to be ejected and collected on the collector grid thereby leaving a predetermined charge pattern on said membrane that produces finely-resolved attractive electrostatic forces that cause said micromirrors to pivot and deflect towards the membrane.

14. The light modulator of claim 13, further comprising a conductive grid on said equipotential layer that ensures electrical continuity between said micromirrors.

15. The light modulator of claim 13, wherein said equipotential layer has an array of holes beneath respective micromirrors, further comprising:
- an insulative layer beneath said equipotential layer; and
- a buried conductive layer between said insulative layer and said substrate that is held at a constant potential, said constant potential creating an electric field through said holes with respect to said reference potential that establishes a constant attractive force on said micromirrors that biases them downward toward said substrate.

16. The light modulator of claim 13, further comprising:
- an array of attractor pads on the backside of said membrane grid that are aligned with said array of micromirrors, said source writing said charge pattern onto said attractor pads such that each micromirror's charge is distributed uniformly across the corresponding attractor pad.

17. The light modulator of claim 16, further comprising:
- an array of attractor pads on the frontside of said membrane facing and aligned with said array of micromirrors, said attractor pads on the membrane's backside and frontside forming an array of series capacitors so that charge deposited on said backside attractor pads produces mirror charges on said frontside attractor pads opposite said micromirrors.

18. The light modulator of claim 13, wherein said charge pattern increases the localized membrane potentials toward the grid potential so that the potential differences between the membrane and the micromirrors produces the finely-resolved attractive electrostatic forces, said micromirrors being susceptible to snap-over when the potential difference exceeds a threshold potential, said collector grid being biased so that said grid potential is less than said threshold potential.

19. A light modulator comprising:
- a vacuum cell;
- a charge controlled mirror (CCM) mounted in said vacuum cell, comprising,
  - a transparent substrate;
  - a transparent equipotential layer on said transparent substrate;
  - a conductive grid on said equipotential layer;
  - an array of electrostatically-actuable cantilevered micromirrors, respective pluralities of said micromirrors sharing portions of said conductive grid as common post regions, said conductive grid, said equipotenital layer and said micromirrors being held at an reference potential;
  - an array of insulating floating-potential post-membranes on said micromirror's common post regions that fan out above the respective micromirrors that share each said post region;
  - an array of attractor pads on said post-membranes that are aligned to the underlying micromirrors; and
  - a collector grid spaced apart from said insulating post-membranes opposite said micromirrors; and
- a source that emits primary electrons that are accelerated through said collector grid and strike the attractor pads on said post-membranes causing secondary electrons to be ejected and collected on the collector grid thereby leaving a predetermined charge pattern on said attractor pads that produces finely-resolved attractive electrostatic forces that cause said micromirrors to pivot and deflect towards the post-membranes.

20. The light modulator of claim 19, wherein each said post-membrane has a plurality of electrically isolated attractor pads that are aligned with the respective plurality of underlying micromirrors.

21. The light modulator of claim 20, further comprising:
- an array of attractor pads on the frontside of said membrane facing and aligned with said array of micromirrors, said attractor pads on the membrane's backside and frontside forming an array of series capacitors so that charge deposited on said backside attractor pads produces mirror charges on said frontside attractor pads opposite said micromirrors.

22. The light modulator of claim 20, wherein said attractor pads are coated with a secondary emission material that exhibits a secondary emission coefficient greater than one.

23. The light modulator of claim 20, wherein said attractor pads exhibit a secondary emission coefficient less than one, further comprising a control pad on each said attractor pad that exhibits a secondary emission coefficient greater than one.

24. A charge controlled mirror (CCM), comprising:

a transparent substrate;

an array of electrostatically-actuable electrically connected micromirrors on said substrate;

an array of insulating posts on said substrate;

a floating-potential insulating membrane supported on said posts above said array of micromirrors, said membrane having a thickness that is less than the micromirror-to-membrane spacing; and a collector grid in said vacuum cell that is spaced apart from said insulating membrane opposite said array.

25. The CCM of claim 24, further comprising an equipotential layer on the substrate that shields the array of micromirrors.

26. The CCM of claim 25, wherein said equipotential layer has an array of holes beneath respective micromirrors, further comprising:

an insulative layer beneath said equipotential layer; and a buried conductive layer between said insulative layer and said substrate that is held at a constant potential, said constant potential creating an electric field through said holes with respect to said reference potential that establishes a constant attractive force on said micromirrors that biases them downward toward said substrate.

27. The CCM of claim 24, further comprising:

an array of attractor pads on one side of said membrane grid that are aligned with said array of micromirrors.

28. The CCM of claim 27, further comprising:

an array of attractor pads on the other side of said membrane aligned with said array of micromirrors, said attractor pads on the membrane's backside and frontside forming an array of series capacitors.

29. A charge controlled mirror (CCM), comprising:

a transparent substrate;

a transparent equipotential layer on said transparent substrate;

an array of electrostatically-actuable cantilevered micromirrors on said equipotential layer;

an array of insulating posts on said substrate;

a thin floating-potential insulating membrane supported by said posts above said array of micromirrors; and a collector grid in said vacuum cell that is spaced apart from said insulating membrane opposite said array.

30. The CCM of claim 29, further comprising a conductive grid on said equipotential layer that ensures electrical continuity between said micromirrors.

31. The CCM of claim 30, wherein said array of micromirrors and said conductive grid are an integral structure with portions of said conductive grid forming post regions for said micromirrors, said insulating posts extending from said post regions to support said membrane.

32. The CCM of claim 29, wherein said equipotential layer has an array of holes beneath respective micromirrors, further comprising:

an insulative layer beneath said equipotential layer; and a buried conductive layer between said insulative layer and said substrate that is held at a constant potential.

\* \* \* \* \*

UNITED STATES PATENT AND TRADEMARK OFFICE
CERTIFICATE OF CORRECTION

PATENT NO.    : 5,991,066
DATED         : November 23, 1999
INVENTOR(S)   : Robinson et al.

It is certified that error appears in the above-identified patent and that said Letters Patent is hereby corrected as shown below:

Column 6,
Line 20, after "source", insert -- 20 --.

Signed and Sealed this

Third Day of September, 2002

Attest:

Attesting Officer

JAMES E. ROGAN
Director of the United States Patent and Trademark Office